June 30, 1970 P. D. BOUCHER ET AL 3,517,958

VACUUM PICK-UP WITH AIR SHIELD

Filed June 17, 1968

INVENTORS
PAUL D. BOUCHER
JOSEPH C. MILLER

BY

ATTORNEYS

United States Patent Office 3,517,958

Patented June 30, 1970

3,517,958
VACUUM PICK-UP WITH AIR SHIELD

Paul D. Boucher, Brookfield, Conn., and Joseph C. Miller, Poughkeepsie, N.Y., assignors to International Business Machines Corporation, Armonk, N.Y., a corporation of New York Filed June 17, 1968, Ser. No. 737,680
Int. Cl. B66c *1/02*
U.S. Cl. 294—64 6 Claims

ABSTRACT OF THE DISCLOSURE

A workpiece holder for planar substrates having on its face central vacuum pickup means and a rearwardly offset concentric array of positive pressure air ports for preventing contamination of the rear surface of the work piece carried thereby.

BACKGROUND OF THE INVENTION

Field of the invention

This invention relates to work piece holders for transporting articles and, more particularly, to holders employing vacuum means on the contact surface thereof for maintaining the work piece attached to the bottom of the holder during transport.

Description of the prior art

In the prior art, it is conventional to employ one or more orifices on the bottom surface of the work piece holder which are coupled to a source of vacuum pressure for suspension and transport of relatively small and fragile articles during the manufacture and processing of the same. It is also conventional to selectively apply pressurized air through either the same orifices or through separate orifices to forceably discharge the article from the work piece after transporting the same between processing stations.

SUMMARY OF THE INVENTION

The primary object of the present invention is to provide, in a work piece holder employing vacuum pick-up means, means for preventing the deposition of contaminants on the rear surface of the work piece during transport. The vacuum pick-up work piece holder of the present invention is particularly useful as a component of a wet process machine in which relatively small, thin and fragile semiconductor wafers are transported between the multiple processing stations along the semiconductor manufacturing line for developing, printing and drying the same. The wafer support area comprises a central, raised boss, ported to a source of vacuum. The concentric recessed or offset portion carries a plurality of spaced orifices coupled to a positive air supply. The vacuum holds the wafer with the positive air being vented radially between the recessed shoulder and the periphery of the wafer to keep the holder and the rear side of the wafer free of contaminants during processing.

DESCRIPTION OF THE PREFERRED EMBODIMENT

Figure 1:
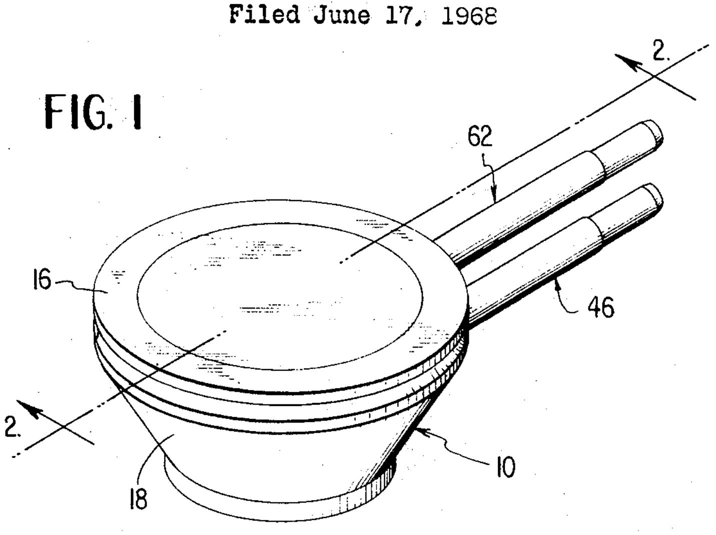
FIG. 1 is a perspective view of the improved work piece holder of the present invention.

The work piece holder 10 of the present invention consists of a pick-up housing 12 of any suitable configuration such as frusto conical formed of a substantially firm material such as stainless steel, aluminum, brass, Teflon or another plastic, such as by molding. The frusto conical pick-up housing shown is thus provided with a reduced diameter or pick-up face 14, a larger diameter top surface 16 and a tapered annular side wall 18. The pick-up housing 12 is bored centrally at 20 and is counterbored at 24. Counterbore 24 receives an annular plug 26 of Teflon or other like material to that forming pick-up housing 12. With the Teflon plug 26 in place, there is, therefore, defined a plenum chamber or cavity 22. Of importance, is the fact that the bottom or pick-up surface 14 is provided with a recessed, annular peripheral portion 28 forming a central, projecting or raised boss or wafer contact platform 30. Boss 30 carries an annular recess 32 and right angle cross connections 34. A single, small diameter bore or hole 38 is drilled centrally of the pick-up housing and extends vertically, at right angles to the work piece holder contact face 14. The hole 38 extends only partially through the pick-up housing 12 toward the top of holder 10. A small diameter horizontal bore 40 intersects the vertical bore 38 near its termination point. Bore 40 is counterbored and threaded at 42 and receives the threaded end 44 of the vacuum outlet 46. Vacuum outlet 46 is preferably made of metal, such as stainless steel and includes a reduced diameter terminal section 48 with a tapered tip for receiving a rubber hose (not shown) leading from a source of vacuum (not shown). The annular recessed portion 28 of the holder contact face, is provided with a pair of concentric annular recesses 52 and 54. A series of circumferentially spaced, small diameter holes or passages 56 and 58 extend vertically from respective annular grooves 52 and 54 to the common plenum chamber 22. A second horizontal threaded bore 60 is carried by the pick-up housing and extends between side wall 18 and plenum chamber 22. This bore is above bore 42 and receives in like fashion, threaded portion 64 of stainless steel tube 62. The plug end 66 of tube 62 is received within small diameter bore 68 axially aligned with threaded bore 60 but extending only partially through the pick-up housing side wall at the other side of plenum chamber 22. A series of holes or ports 70 extend transversely through portion 72 of the air inlet tube 62 which lies within chamber 22. In like manner to the vacuum outlet tube 46, the outer terminal end 74 of this tube is of reduced diameter and is tapered at 76 to receive a pressurized air supply hose (not shown) carrying pressurized positive pressure air from a source (not shown).

Figure 2:
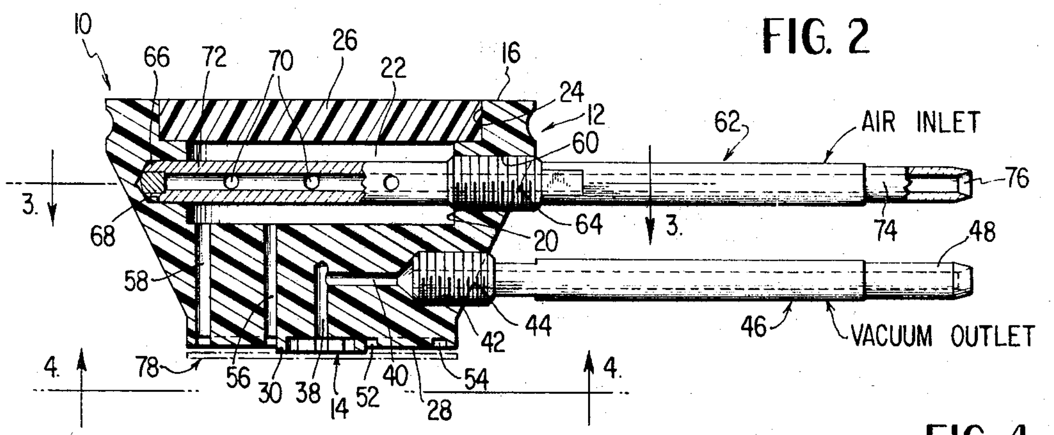
FIG. 2 is a sectional elevation of the holder of FIG. 1 taken about lines 2—2 of FIG. 1.
Figure 4:
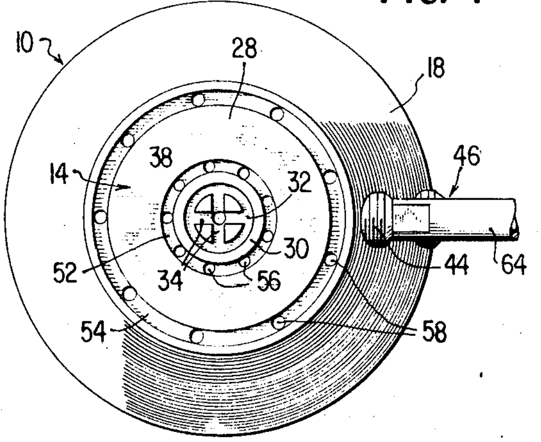
FIG. 4 is a bottom plan view of the holder of FIG. 2 taken about lines 4—4 of FIG. 2.
Figure 3:
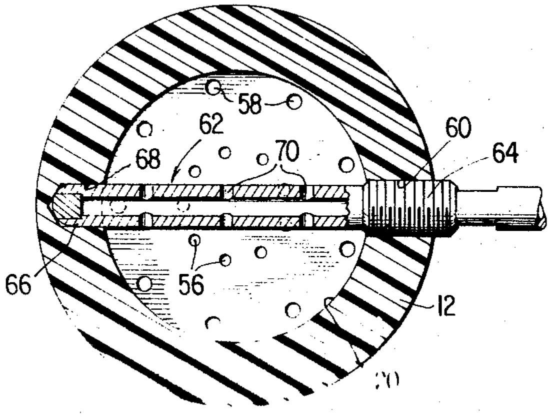
FIG. 3 is a plan view in section of a portion of the holder taken about lines 3—3 of FIG. 2.

With the inner end of the inlet tube plugged, and with the circular Teflon plug 26 sealed to the top of pick-up housing 12 air under positive pressure is delivered to the plenum chamber and thence to the concentric annular grooves 52 and 54 on the pick-up face of the holder. At the same time, the vacuum outlet tube 46 is connected to a source of vacuum pressure. This provides a central, rather small area defined by the boss or platform 30 of vacuum pressure sufficient to maintain a semiconductor wafer or other article in contact therewith during transport. As best seen in FIGS. 2 and 4, positive air pressure fills the groove 54 immediately adjacent the raised annular platform 30 while interiorly of this platform, there exists a vacuum pressure of a level sufficient to maintain the light weight wafer, shown in dotted lines at 78, in contact with the pick-up housing and positioned on the raised boss or platform rim 30 of pick-up face 14 regardless of the force created by the pressured air exiting from plenum chamber 22 through the circumferential array of orifices 56 and 58.

It is important to note, therefore, that the holding force provided by the vacuum operating on a smaller central portion of the wafer 78 is in excess of that force provided by the pressurized air acting on the wafer periphery. Of course, only a small flow of air at low velocity is required to remove or prevent contaminants from adhering to the rear surface of the vacuum held wafer 78.

It is also to be understood, that while the invention has been described in conjunction with a vacuum pick-up, work holder piece that supports a thin, semiconductor wafer, the apparatus of the present invention may be readily applied to the vacuum support of a transported article of much larger size and completely unrelated to the electrical or electronic field. The extent with which the annular rim 30 and the segments 32 project from the annular surface 28 adjacent thereto, of course varies depending upon the amount of the pressure of the applied fluid and the particular article being supported by the vacuum pick-up holder. It is only necessary that a gap of sufficient size be provided between the work piece and annular surface 28 such that the pressurized air may readily exit in a radial manner to maintain the adjacent surfaces free of contaminants.

While the invention has been particularly shown and described with reference to a preferred embodiment, it will be understood by those skilled in the art that the foregoing and other changes in form and details may be made therein without departing from the spirit and scope of the invention.

What is claimed is:

1. A holder for picking up and transporting planar substrates and the like comprising:

(a) a pick-up face adapted to overlie said substrate during pickup, (b) first means defining a first area on said pick-up face for subjecting a portion of said substrate to vacuum pressure to maintain said work piece in contact with said pick-up face during transport, and (c) second means defining a second area, radially outwards of said first area, spaced inwardly from said work piece, and subjected to pressurized air for maintaining said second pick-up face area and the rear of said work piece free of contaminants during transport.

2. The holder as claimed in claim 1 wherein said first means comprises a boss carrying a vacuum port, and said second means comprises an annular recessed surface portion surrounding said vacuum port, and at least one positive air pressure port opening onto said recessed face portion, radially beyond said boss.

3. A work piece holder for picking up and transporting thin semiconductor wafers comprising: a body having a pick-up face including a central projecting surface portion for contacting said wafer and a peripheral recessed surface portion radially outward of said face contacting portion, means for subjecting said portion of said work piece in contact with said pick-up face to a vacuum pressure for maintaining said work piece in contact therewith, and means for subjecting said recessed portion to pressurized air whereby, pressurized air, in escaping radially between said recessed portion of said pick-up face and the rear surface of said attached wafer, maintains said recessed portion of said holder and the rear surface of the work piece free of contaminants during transportation.

4. The work piece holder as claimed in claim 3 wherein said means for subjecting said pick-up face to a vacuum pressure comprises a bore subjected to vacuum pressure and an enlarged surface recess adjacent thereto for subjecting a major portion of the center of said wafer to vacuum pressure for maintaining the wafer affixed thereto during transport.

5. The work piece holder as claimed in claim 4 wherein said peripheral recessed area of said pick-up face carries a pair of concentric annular grooves, and a plurality of pressurized air discharge holes opening into respective concentric grooves.

6. The work piece holder as claimed in claim 5 wherein; said holder body is bored and counterbored at the end opposite said pick-up face, a cylindrical plug sealably is carried by said pick-up housing within said counter bore to form therewith, a sealed plenum chamber, said plurality of air discharge holes pass from said concentric grooves to said plenum chamber, and said body carries means for supplying pressurized air to said plenum chamber.

References Cited

UNITED STATES PATENTS

| | | | |
|---|---|---|---|
| 2,905,768 | 9/1959 | Cronquist. | |
| 3,220,723 | 11/1965 | Rabinow. | |
| 3,223,443 | 12/1965 | Misson | 294—65 |
| 3,425,736 | 2/1969 | Benjamin | 294—64 |
| 3,431,009 | 3/1969 | Mammel | 294—64 |
| 3,438,668 | 4/1969 | Olsson et al. | 294—64 |

ANDRES H. NIELSEN, Primary Examiner